United States Patent [19]

Parker

[11] Patent Number: 5,580,083
[45] Date of Patent: Dec. 3, 1996

[54] AIR BAG COVER WITH SEAMLESS INTERFACE TEAR SEAM AND METHOD AND APPARATUS FOR PRODUCING SAME

[75] Inventor: Thomas G. Parker, Imperial, Mo.

[73] Assignee: Davidson Textron Inc., Dover, N.H.

[21] Appl. No.: 537,520

[22] Filed: Oct. 2, 1995

[51] Int. Cl.$^6$ ..................................................... B60R 21/16
[52] U.S. Cl. ...................................... 280/728.3; 156/289
[58] Field of Search ............................ 280/728.3, 728.2, 280/731, 732; 156/289

[56] References Cited

U.S. PATENT DOCUMENTS 5,458,361  10/1995  Gajewski ............................ 280/728.3

FOREIGN PATENT DOCUMENTS 2703011  9/1994  France ................. 280/728.3
4-50055  2/1992  Japan .................. 280/728.3

Primary Examiner—Paul N. Dickson
Attorney, Agent, or Firm—Reising, Ethington, Barnard & Perry

[57] ABSTRACT

A cover for an air bag unit is disclosed having a patterned tear seam therein defined by a partially bonded material same as the cover material. Apparatus for forming the cover includes a thin shell mold having an inner surface that is heated to melt thermoplastic material cast thereon. A powder box adapted to contain thermoplastic material therein for distribution onto the thin shell mold carries a gasket having a shape corresponding to the tear seam shape. The powder box and gasket are adapted to be connected to the thin shell mold for forming a sealed footprint on the inner surface during distribution of the cast material against heated surface portions of the thin shell mold to form a thermoplastic cover with a narrow gap therein conforming to the desired tear seam pattern. The cover while in the shell mold is coated along the margins of the gap with a plastic parting agent and then more of the same or similar thermoplastic material is deposited in the gap and over the parting agent to form a partially bonded thermoplastic tear seam.

6 Claims, 3 Drawing Sheets

AIR BAG COVER WITH SEAMLESS INTERFACE TEAR SEAM AND METHOD AND APPARATUS FOR PRODUCING SAME

TECHNICAL FIELD

This invention relates to covers for air bag units located within the interior of a motor vehicle and more particularly covers having an invisible tear seam therein and to apparatus and a method for producing same.

BACKGROUND OF THE INVENTION

Various proposals have evolved for covering air bag units. One primary objective is to provide a cover having a weakened section that will separate to provide an opening through which the air bag can escape for deployment.

Air bags are typically mounted in canisters in the steering wheel or in an instrument panel or crash pad on the driver's side of the vehicle. If the air bag is mounted on the passenger side, the canister is typically stowed behind an instrument panel either in a top mount position or in a front mount position. Such mounting arrangements require that the cover material of the steering wheel hub or the skin or cover of the instrument panel be specially configured during manufacture to produce a weakened section to define a seam therein that will readily open with bag deployment.

Such manufacturing methods and resultant structure call for various functional and aesthetic requirements. For example, the seam must be configured to separate such that the air bag can be deployed immediately after vehicle impact. However, the cover must have a seam that is configured such that the air bag unit is protected against either accidental or intentional tampering and additionally the seam should be configured to meet long term weathering and interior design appearance requirements. As to design appearance, there is a desire in some cases to form the surface of the cover as a smooth uninterrupted surface so that there is no indication that there is an air bag unit disposed beneath the surface. This interior design objective is desired from both a human psychology standpoint and a pure esthetics standpoint. In the case of the psychological considerations, the smooth surface effectively meets the adage of "out of sight out of mind" such that a passenger is not reminded of the possibility of deployment of an air bag unit. Then there is the interior design consideration for smooth flowing surfaces to be incorporated in the cover material of an instrument panel on the passenger side.

U.S. Pat. No. 3,640,546, issued Feb. 1, 1972 to D. S. Brawn, includes a cover for an air bag unit having two doors that are covered by an outer layer of material that is weakened along a joint line by reducing the thickness of the outer layer. Such thin sectioned seam lines can cause a resultant depression over time that will essentially outline the outlet from the canister for the air bag component of the air bag unit. The arrangement does not solve either the psychological awareness problem or the problem of retaining a smooth, flowing surface appearance.

U.S. Pat. No. 4,246,213, issued Jan. 20, 1981 to Y. Takamatsu et al., discloses a method for casting a V-shaped section at the tear seam. While the outer surface of the cover material is smooth, the V-shaped configuration also reduces the thickness of the outer layer in an undesirable manner.

U.S. Pat. No. 5,082,310 discloses a cover for an air bag unit having two doors that are hinged for pivotal movement during air bag deployment. The doors are covered by a layer of foam and the layer of foam is covered by an outer skin having a V-shape groove that is cut to weaken the skin and again in an undesirable manner.

One problem common to designs that cut or score a tear seam into an outer skin is that plastic materials, especially at cold temperatures, are prone to becoming brittle such that the cut or score line can induce highly undesirable cracking along the seam. At opposite temperature extremes, typical skin cover material such as thermoplastic olefins or thermoplastic polyvinyl chloride become relatively soft and deformable such that they will stretch and tend to remain unbroken during initial bag deployment. Another problem that can arise with cut or scored tear seams is that they become observable through the outer surface following extended periods of exposure to heat and sunlight.

Another specific disadvantage of the cover shown in the above '310 patent and another cover shown in U.S. Pat. No. 4,886,630 is that they require that the outer skin be separately formed on a heated mold and then removed from the mold and cut before being co-molded to a foam layer in a subsequent molding operation.

The problems arising from separately forming a skin and then cutting the grooves therein are obviated by the present method that employs casting techniques disclosed in U.S. Pat. Nos. 4,623,503, issued Nov. 18, 1986 to E. Anestis et al., U.S. Pat. No. 4,562,025, issued Dec. 31, 1985 to John D. Gray, U.S. Pat. No. 4,925,151, issued May 15, 1990 to John D. Gray, and U.S. Pat. No. 5,288,103, issued Feb. 22, 1994 to Parker et al., all of which are commonly assigned to the assignee of the present invention and each of which is hereby incorporated by reference.

SUMMARY OF THE INVENTION

The present invention is directed to an air bag cover assembly having a skin or a shell with a tear seam therein having a desired configuration. For example, the C, H, U, and X patterns commonly used to form tear patterns in the skin that will open on air bag deployment to form an opening through which the air bag can pass as it inflates to protect an occupant of the vehicle. In particular, the skin or shell is formed of a thermoplastic material with a predetermined thickness and with a narrow gap therein that has a configuration corresponding to the desired tear seam configuration. A plastic release agent is then applied to the inner side of the shell along margins on opposite sides of the gap and over the surface of the gap. A second layer of the same or similar thermoplastic material is then deposited over the release agent and in the gap and heated to complete the formation of the shell. The release agent acts as a barrier preventing the two layers of like plastic material at the thus filled gap from thoroughly bonding together and thereby forms a seamless relatively weak interface tear seam that will give way with bag inflation to form an opening for deployment of the bag.

Apparatus for forming the skin or shell for the cover assembly includes a heatable mold. A powder box carries a seal gasket that is shaped to correspond to the shape of the desired tear seam configuration. The powder box with seal gasket thereon is adapted to be connected to the heatable mold and to contain thermoplastic material such as thermoplastic olefins or urethanes or thermoplastic material such as polyvinyl chloride (PVC) such as the pigmented particles or powder set-forth in U.S. Pat. No. 4,784,911 also commonly assigned to the assignee of the present invention and also hereby incorporated by reference. The gasket pattern is arranged to impress against the surface of the heatable mold during the casting process and to leave a sealed footprint thereon that corresponds to the shape of the desired tear seam configuration.

When the heatable mold is connected to the powder box, the gasket seals the mold surface such that following casting and curing of the skin or shell a narrow gap is formed therein around the perimeter of the gasket having the same pattern as the desired tear seam. In order to produce the cover of the present invention the gasket is retracted and a plastic release or parting agent is then applied by spray or brush to cover along both sides of the narrow seam forming gap. More of the same or similar thermoplastic material is then cast or sprayed over the release agent including the narrow seam forming gap to fill the latter and overlay adjacent margins of the shell to form a weak seamless interface tear seam.

Accordingly, an object of the present invention is to provide an easily assembled low cost outer skin or shell for use in a cover assembly for an air bag unit deployable into the passenger compartment of a motor vehicle wherein the outer skin has a preformed gap therein of the same thickness as the remainder of the outer skin but conforming to a desired tear seam configuration established by an end user and wherein the gap is filled to form a filler strip that is of the same or compatible thermoplastic material but does not thoroughly bond with the outer skin to define a smooth, uninterrupted outer surface extending across both the preformed opening and the remainder of the outer skin with a weak seamless interface tear seam.

A feature of the present invention is to provide such a low cost outer skin having a filler of the same thermoplastic material that fills the preformed gap and wherein the filler does not thoroughly bond with the remainder of the outer skin resulting in a weak interface seamless tear seam.

Another feature of the present invention is to provide a filler of thermoplastic material the same as or compatible with an air bag cover that fills a preformed tear seam gap in the cover but is prevented from thoroughly bonding therewith by the intervention of a parting agent.

Still another feature of the present invention is to provide such a low cost outer skin having a cast thermoplastic outer skin with a preformed narrow gap therein conforming to a desired tear seam configuration and a filler of the same or compatible thermoplastic material that fills the preformed gap to form a smooth uninterrupted outer surface on the outer skin but does not thoroughly bond therewith so as to foam a weak seamless interface tear seam.

Another object of the present invention is to provide an improved apparatus for manufacturing the low cost outer skin of the present invention including a heatable mold member; a powder box and a gasket connected to the powder box that has a configuration that corresponds to the shape of a desired seam configuration for a cover assembly that hides an underlying air bag unit and wherein the gasket further is mounted to engage a surface portion of the interior of the heatable mold member to form a sealed narrow footprint on the surface portion around which a thermoplastic material is cast to form an outer skin with a preformed narrow gap therein corresponding to the shape of a desired seam configuration and wherein the gasket is retracted for a plastic release agent to be applied along the preformed gap followed by an application thereover of the same or compatible thermoplastic material to fill the gap and partially overlay the backside of the outer skin along the gap.

Still another object of the invention is to provide a method for forming a weakened tear seam in the cover for an air bag unit comprising the steps of sealing along a narrow footprint corresponding to a tear seam, forming a preformed narrow gap corresponding to a tear seam pattern in a first thermoplastic material, applying a plastic release agent along the preformed gap, and filling the preformed gap with the same or compatible thermoplastic material over the plastic release agent.

These and other objects, features and advantages of the present invention and a more complete understanding thereof will be apparent to those skilled in the art from the succeeding detailed description of the invention and the accompanying drawings thereof.

BRIEF DESCRIPTION OF THE DRAWINGS

A preferred exemplary embodiment of the present invention will hereinafter be described in conjunction with the appended drawings, wherein like designations denote like elements, and.

DESCRIPTION OF PREFERRED EMBODIMENT

Figures 6, 6A:
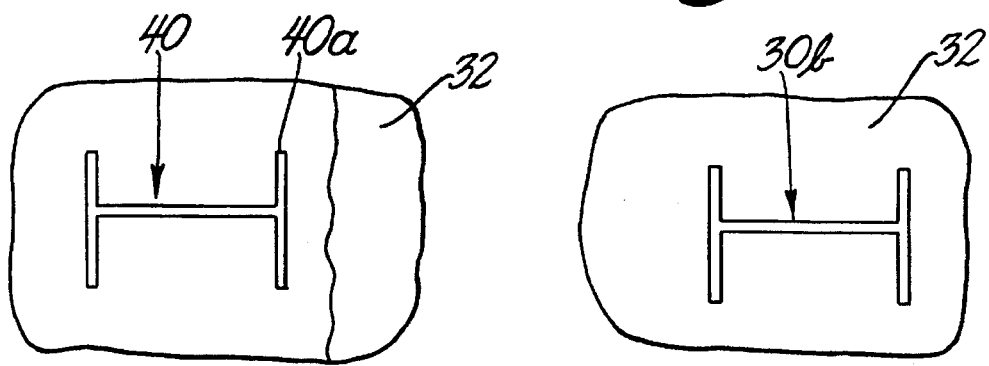
FIG. 6 is a fragmentary view of a gasket footprint on a shell tool.
FIG. 6A is a fragmentary top elevational view of the shell tool following casting of thermoplastic material around the gasket footprint and following separation of the shell tool from the powder box and tear seam pattern gasket and showing a cast skin or shell having a preformed narrow gap therein corresponding to a desired tear seam configuration.
Figure 7:
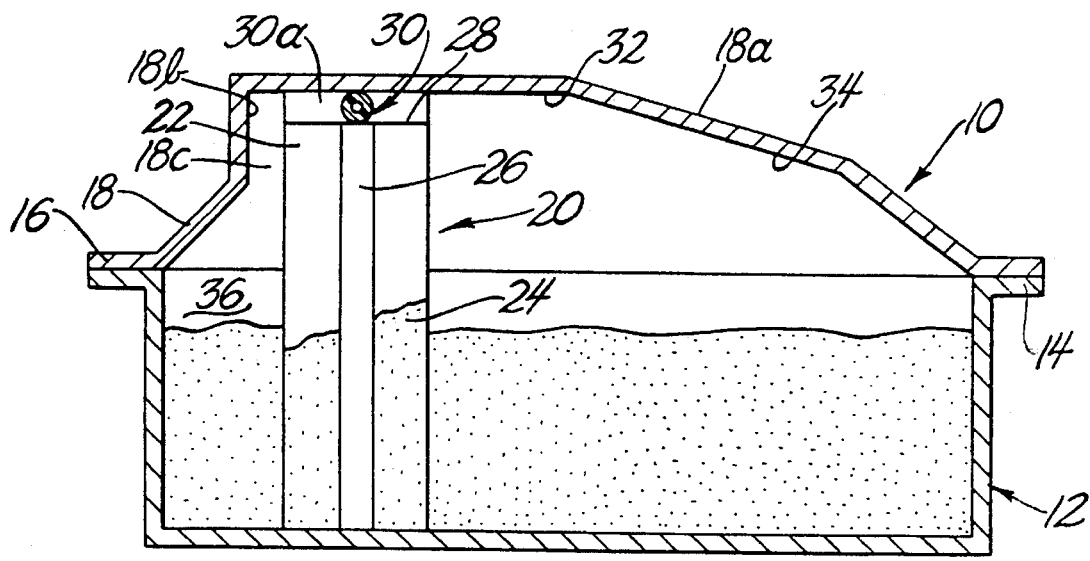
FIG. 7 is a diagrammatic view of a shell tool and powder box apparatus of the present invention having a tear seam pattern with gasket thereon.

In accordance with a preferred embodiment of the invention in FIG. 6, an apparatus 10 is illustrated in FIG. 7 for manufacturing the outer skin and air bag deployment cover assembly of the present invention. The apparatus 10 includes a powder box 12 having a peripheral portion 14 adapted to be connected to the peripheral portion 16 of a shell tool 18 by suitable clamps that join the peripheral portions in a known manner.

The powder box 12 has a tear seam pattern 20 connected thereto that includes two cross legs 22, 24 and a center portion 26 that form an H-shaped pattern. Each of the legs 22, 24 and the center portion extend beyond the depth of the powder box and outwardly of the peripheral portion 14 of the powder box such that they will penetrate into the interior of the shell tool 18 when the powder box 12 is clamped to the shell tool 18. Each of the legs 22, 24 and center portion 26 have a gasket mounting surface 28 thereon on which is affixed a gasket 30.

The gasket 30 is shown as an H-shaped configuration and is conformable to a flat surface region 32 on the inner surface 34 of the shell tool 18 to form an H-shaped footprint 30b thereon as shown in FIG. 6. The gasket 30 will bridge the distance between the mounting surface 28 and the flat surface region 32 and form a sealed narrow foot print on the flat surface region 32. The gasket 30 can, of course, have any shape desired so long as it corresponds to the tear seam pattern.

The process for manufacturing the outer skin and cover assembly of the present invention includes initially locating the shell tool 18 in an inverted position as shown in FIG. 6 such that the inner surface 34 faces downwardly. The shell tool 18 is mated to the powder box 12 that contains a powdered thermoplastic material. When the peripheral portions 14, 16 are connected the shell tool 18 and powder box 12 there is formed a sealed mold chamber 36 defined by the inner surface 34 and the interior walls of the powder box 12. The thermoplastic material can be a dry resin powder material with suitable coloring and plasticizer content, such as described in U.S. Pat. No. 4,923,657 issued May 8, 1990 to J. C. Gembinski et al. The shell tool is heated to a sufficient temperature to cause approximately one millimeter of dry powder to attach and fuse. Mold apparatus 10 is then inverted or rotated as a unit 180 degrees to dump the dry powder against the surface 34. Since the inner surface is heated, a layer of the dry powder forms across the surface 34 and about the outer peripheral edge 30a of the gasket 30 defining a gasket footprint 30b shown in FIG. 6 and fuses to form a skin 40 of plastic with a narrow H-shaped gap or opening 40a therein at the foot print 30b of the gasket 30. The remaining powder is dumped back into the powder box by again inverting or rotating the mold apparatus 10 as a unit back to the initial position shown in FIG. 6. The powder box 12 and shell tool 18 are then disconnected and the shell tool 18 is heated more to cure the thermoplastic layer.

Figure 8A:
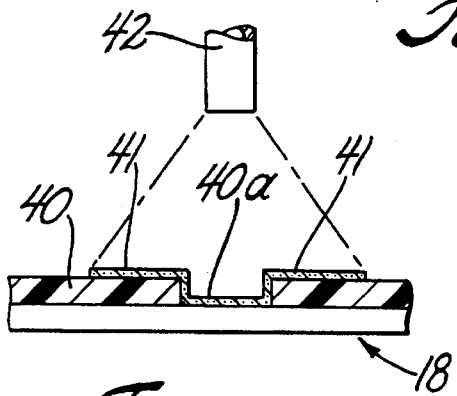
FIG. 8A is a diagrammatic view showing a plastic parting agent being applied to the preformed narrow gap while the skin remains in the shell tool.
Figure 8B:
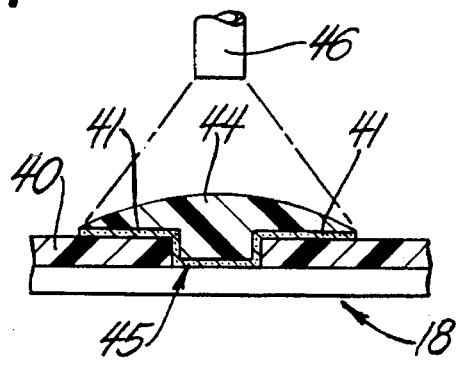
FIG. 8B is a view similar to FIG. 8A showing the addition of thermoplastic material to the gap and adjacent margins of the backside of the skin along the gap.

While the skin 40 is in the shell tool 10 (FIG. 8A), a plastic parting or release agent 41, such as wax or silicone, is then brushed or sprayed with a nozzle 42 on the inner side of the skin 40 along and on both sides of the gap 40a and on the surface of the gap. Thereafter, an additional layer 44 of the same or compatible thermoplastic material as the skin 40 is cast or sprayed with a nozzle 46 over the release agent 41 filling and spanning the gap 40a as illustrated in FIG. 8B. Preferably, the layer 44 and parting agent 41 span the gap by several times its width and extend in equal width margins along the gap. The shell tool 10 is heated to suitably cure the additional thermoplastic layer 44 that makes up a filler strip 40b flush with the outer surface of the cover (the thickness of the parting agent 41 being exaggerated for purposes of illustration). Finally, the shell tool 10 is cooled but the added thermoplastic layer 44 does not thoroughly bond to the skin 40 even though it is of the same or compatible material because of the intervention of the release agent 41. As a result, there exists a weak interface between the skin 40 and the added layer 44 thus forming a weak seamless interface tear seam along the filled gap.

Automated production apparatuses for performing such steps are well known to those skilled in the art including U.S. Pat. Nos. 4,623,503, issued Nov. 18, 1986 to E. Anestis et al., U.S. Pat. No. 4,562,025, issued Dec. 31, 1985 to John D. Gray and U.S. Pat. No. 4,925,151 issued May 15, 1990 to John D. Gray. The manner of heating the shell tool 18 will depend upon a particular operation but it is contemplated that heating by directing a heated air stream on the outer surface 18a of the shell tool 18 will work well. Further, in the case of the illustrated embodiment, when engaged with the shell tool 18 will be spaced from side walls 18b, 18c thereof. The gasket 30 cross-section can be a foam compressible material such as a temperature resistant foam or it can be a hollow gasket either of the inflatable or non-inflatable type such as is disclosed in U.S. Pat. No. 4,925,151 issued May 15, 1990 to John D. Gray.

Figure 1:
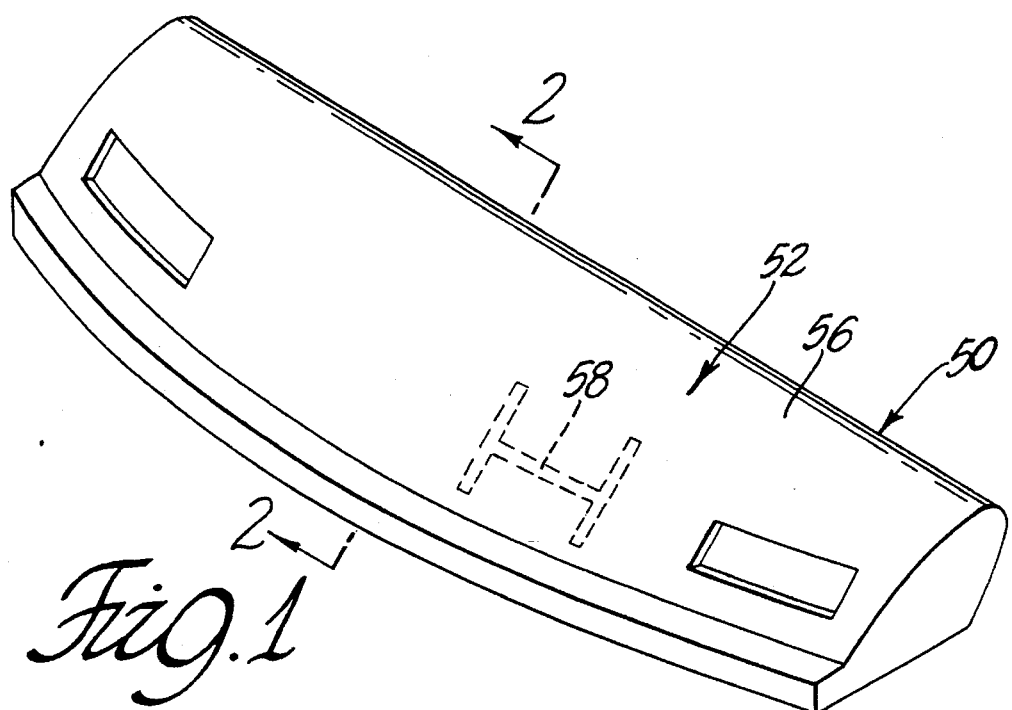
FIG. 1 is a perspective view of an automobile interior trim structure incorporating a tear seam of the present invention made from the apparatus and method of the present invention.
Figure 2:
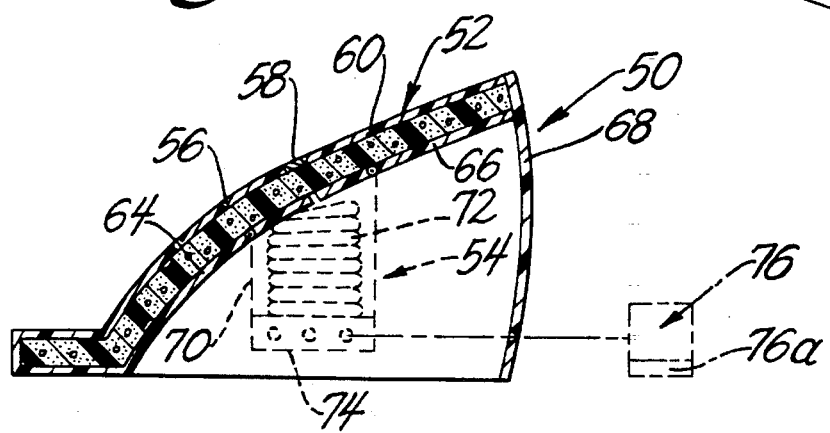
FIG. 2 is a cross-sectional view taken along the line 2—2 of FIG. 1 looking in the direction of the arrows.
Figure 3:
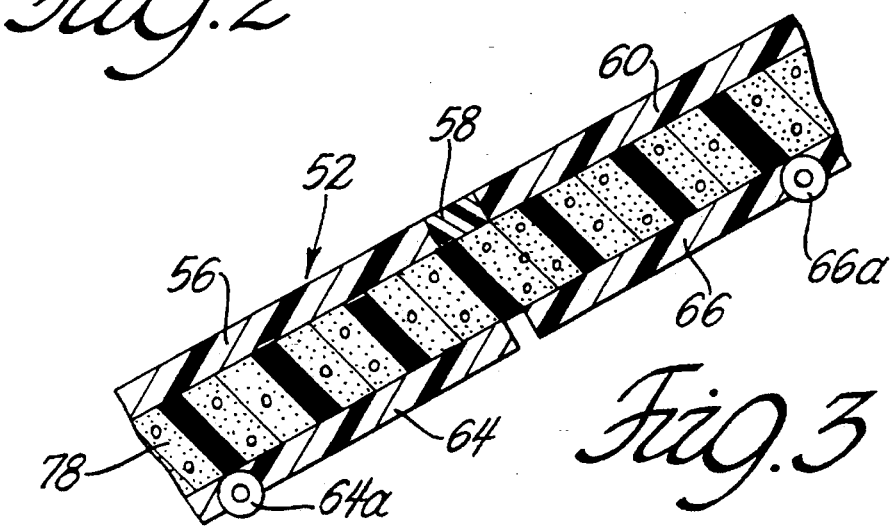
FIG. 3 is an enlarged cross-sectional view of the structure of FIG. 2 showing the detail of a seamless weak interface tear seam of the present invention.
Figure 4:
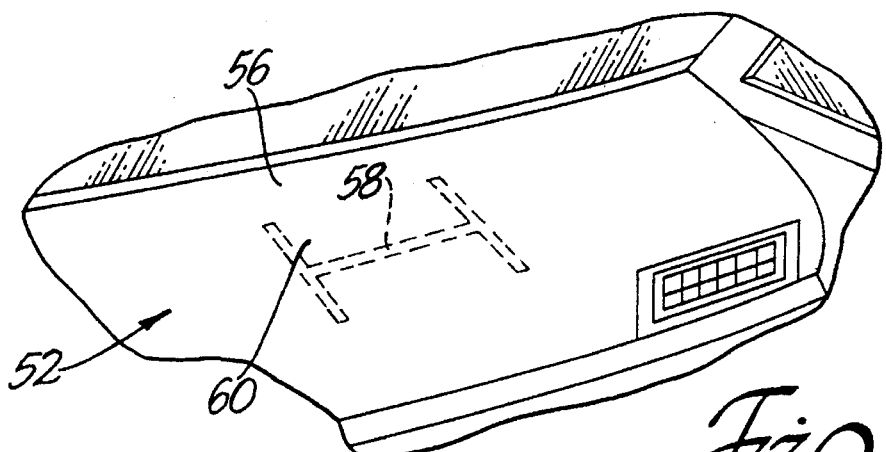
FIG. 4 is partial perspective view of an instrument panel mounted within an automobile interior compartment and showing in hidden lines a tear seam of the present invention overlying an air bag deployment cover.
Figure 5:
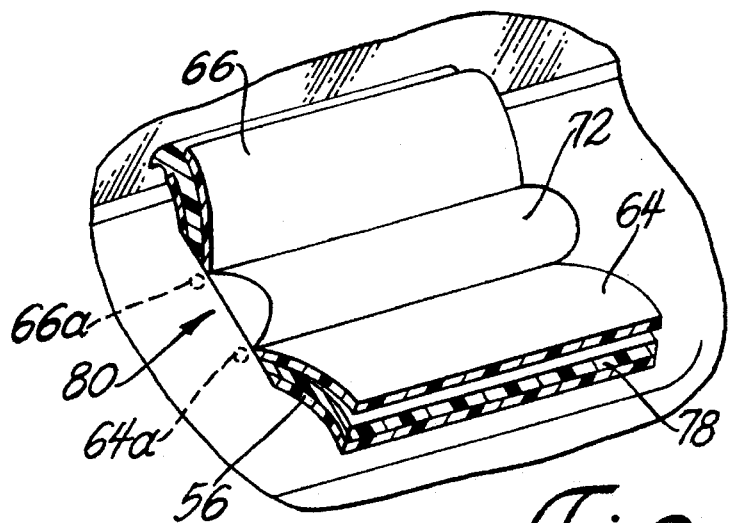
FIG. 5 is a partial perspective view of the instrument panel of FIG. 4 with the air bag deployment cover in an open position and with the tear seams therein separated.

FIGS. 1–5 show an automobile interior trim structure 50 that includes a cover assembly 52 for hiding an air bag unit 54 shown in outline broken line form in FIG. 2. In FIG. 1 an outer skin 56 is shown having a H-shaped seamless interface tear seam 58 as described above that is significantly weaker than the surrounding outer skin 56 made of the same or compatible thermoplastic material. The cover assembly 52 has a smooth uninterrupted outer surface 60 that extends across the tear seam 58 as the latter is formed flush therewith. In the illustrated embodiment the cover assembly 52 includes a pair of doors 64, 66 formed as part of an insert 68 that forms an enclosure for an air bag canister 70 having a deployable air bag 72 therein. The air bag 72 is inflated by a gas generator 74 upon ignition in response to a signal from a controller 76 including collision sensing device 76a as is well known in the art. The configuration of the air bag unit and the arrangement of the components thereof will depend upon a particular application and form no part of the present invention. Furthermore, the cover assembly 52 can be formed to have a single door or other configuration that will spread open to bear against the outer skin 56 so as to cause separation thereof at the seamless interface tear seam 58 that defines a lesser strength region in the outer skin 56 that will immediately separate upon air bag deployment. In the illustrated embodiment, the weak interface seam 58 forms an H-shaped tear seam within the outer skin 56. The doors 64, 66 will pivot about hinges 64a, 66a as shown in FIG. 3 to press through a foam layer 78 located between the insert 68 and the outer skin 56. The doors 64, 66 will act on the lesser strength region defined by the tear seam strip 58 to produce an immediate separation of the outer skin 56 to form an opening 80 as shown in FIG. 5 such that the air bag 72 will be free to deploy into the passenger compartment immediately following a collision that will ignite the gas generator 74 and inflate the air bag 72 for deployment through the opening 80 formed by the separation of the H-shaped tear seam.

In accordance with the invention, the H-shaped tear seam has a surface smoothness like that of the surrounding regions of the outer skin such that the cover assembly 52 will appear as a continuous uninterrupted surface overlying the outlet from the canister that houses the air bag. It will of course be understood that the tear seam 58 that forms the lesser strength material region within the outer skin 56 can be shaped in other ways including C, U or X shapes as illustrated in U.S. Pat. No. 5,154,444 issued Oct. 13, 1992 and commonly assigned with the present patent application.

The outer skin 56 at the tear seam 58 has the necessary thickness to hide any tendency to read through the location of the doors or the outlet from the canister. Nevertheless, the tear seam 58 provides a weak link at which the outer skin 56 will be easily separated.

Figure 9:
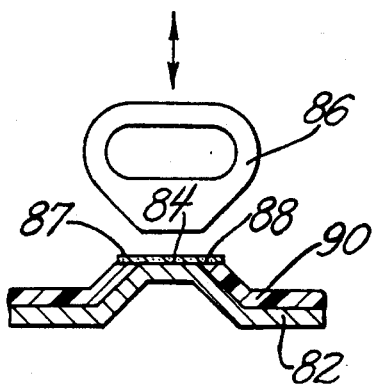
FIG. 9 is a fragmentary sectional view of apparatus used in practicing another embodiment of the method of this invention in forming another embodiment of an outer skin for the cover assembly of the present invention as shown in FIG. 10.
Figure 10:
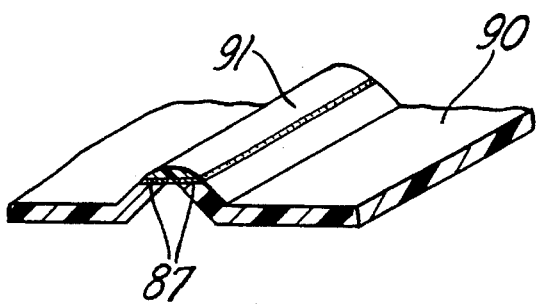
FIG. 10 is a fragmentary perspective view of the embodiment of the outer skin formed by the apparatus and method of FIG. 9.

In some cases, the need for a hidden seam line is less critical. If so, the method will include providing a nickel alloy mold shell 82 having a styling line protrusion 84 therein. As shown in FIG. 9, the sealing gasket 86 is positioned over the protrusion 84 to form a sealed footprint corresponding to a desired tear seam pattern. The thermoplastic material is cast as layer 90. The gasket 86 is removed, a plastic parting agent 87 is applied and a preformed opening 88 in layer 90 is then filled by casting, spraying or otherwise depositing a second layer 91 of the same or compatible thermoplastic material over the parting agent 87. A resultant recessed styling filler strip 92 is formed on the layer 90 as shown in FIG. 10.

It will be appreciated from the foregoing description that the present invention not only includes an outer skin configuration that will assure cover assembly opening immediately upon vehicle collision but additionally an outer skin configuration that will hide an underlying air bag unit over long periods of time. Furthermore, the arrangement will protect an underlying air bag unit against either accidental or intentional tampering since there is no structure or door that can be pried open or inadvertently depressed into the structure of the air bag unit. It will be further appreciated by those skilled in the art that the foregoing description is of a preferred exemplary embodiment of the invention and that the invention is not limited to the specific embodiments or material selections shown or discussed. For instance, in the broader aspect of the apparatus the gasket can be carried by a separate carriage apart from a powder box such that the initial skin can be formed around a gasket footprint by spray deposit of the thermoplastic material rather than rotational coating of the thermoplastic powder. For instance, in the broader aspect of the method, the initial coating with preformed gap can be formed by an injection molding or a spray step and the filling of the preformed gap can be accomplished by robotic deposition of the thermoplastic material. In addition to thermoplastic PVC spray coatings, the method of the invention contemplates the use of spray coating thermoplastic urethane materials to either form the preformed gap in the skin or shell or to add the same tear seam forming material.

Various changes and modifications will be apparent to those skilled in the art and all such variations and modifications are intended to come within the spirit and scope of the appended claims.

What is claimed is:

1. In a cover assembly for an air bag unit deployable into the passenger compartment of a motor vehicle through an opening in the cover assembly at a separable hidden tear seam in the cover assembly, the improvement comprising:

an outer skin formed of polymeric material and having a smooth outer surface;

means forming a preformed gap in said outer skin; said preformed gap having a thickness corresponding to the thickness of the remainder of the outer skin and having a shape conforming to an outlet from the air bag unit;

a filler strip within said preformed gap bonded to said outer skin and having an outer surface that joins the outer surface of the outer skin to form a smooth uninterrupted outer surface extending across all of the outer skin whereby there is no readout of the presence of a air bag unit beneath the outer skin; said filler strip being of the same or compatible material as said outer skin; and a plastic parting agent between said filler strip and said outer skin whereby said filler strip and said outer skin are not thoroughly bonded together and said filler strip will immediately separate from said outer skin to form an opening upon deployment of the air bag from the air bag unit.

2. The cover assembly of claim 1, wherein said plastic parting agent is wax.

3. The cover assembly of claim 1, wherein said plastic parting agent is silicone.

4. The cover assembly of claim 1, wherein said filler strip and said plastic parting agent extend over and along opposite sides of said preformed gap on an inner side of said outer skin and also along the surface of said outer skin defining said preformed gap.

5. The cover assembly of claim 4, wherein said filler strip and said plastic parting agent extend in margins on said inner side of said outer skin along said preformed gap.

6. The cover assembly of claim 4, wherein said plastic parting agent interfaces with said filler strip and said outer skin at the surface of said preformed gap and along margins of predetermined width on said inner side of said outer skin.

* * * * *